No. 742,126. PATENTED OCT. 20, 1903.
J. J. McFERRIN.
LIFTING JACK.
APPLICATION FILED APR. 27, 1903.
NO MODEL.

Witnesses:
S. Mahlon Unger
Russell T. Macbeth

Inventor,
John J. McFerrin,
By Joseph A. Minturn,
Attorney.

No. 742,126. Patented October 20, 1903.

UNITED STATES PATENT OFFICE.

JOHN J. McFERRIN, OF INDIANAPOLIS, INDIANA, ASSIGNOR OF ONE-HALF TO JOHN J. VALDENAIRE, OF INDIANAPOLIS, INDIANA.

LIFTING-JACK.

SPECIFICATION forming part of Letters Patent No. 742,126, dated October 20, 1903.

Application filed April 27, 1903. Serial No. 154,504. (No model.)

*To all whom it may concern:*

Be it known that I, JOHN J. MCFERRIN, a citizen of the United States, residing at Indianapolis, in the county of Marion and State of Indiana, have invented certain new and useful Improvements in Lifting-Jacks, of which the following is a specification.

This invention relates to improvements in lifting-jacks; and the object of the invention is to provide a simple, durable, and strong construction that will be inexpensive to manufacture and powerful in its lifting capacity. I accomplish these objects by the mechanism illustrated in the accompanying drawings, in which—

Figure 1:
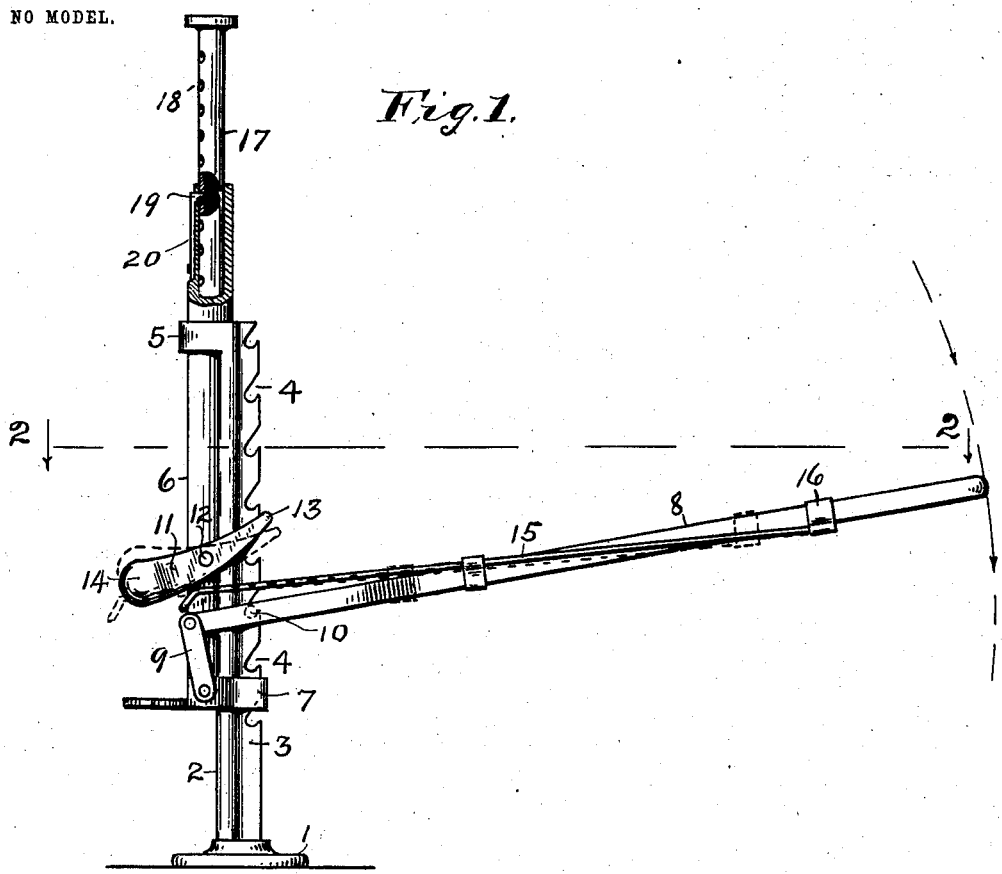
Figure 2:
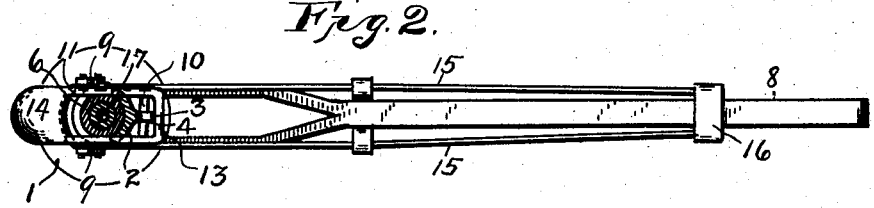

Figure 1 is a side elevation and partial vertical section of my invention in operative position, the hand-lever being at about the middle of its downward movement; and Fig. 2, a horizontal section on the line 2 2 of Fig. 1.

Like characters of reference indicate like parts throughout both views of the drawings.

1 is the base, upwardly from which extends the standard 2. The latter has the longitudinal flange 3, with notches 4 to receive a dog which holds the adjustable portion of the jack, as will hereinafter be described. The top of the standard 2 has the band 5, and that side of the standard next to the band is provided with a half-round longitudinal groove. An adjustable member 6 of the jack is introduced through the band 5 and is located in the said longitudinal groove of the standard. This member 6 will preferably be a section of gas or other metal tubing, having a band 7 at its lower end, which passes around the standard, as shown in Fig. 1.

8 is a hand-lever which is bifurcated at its lower end to receive the standard and adjustable member 6 between the forks of the lever. The inner ends of this lever are connected by link-bars 9 9 with the lower end of the member 6, the pivotal connections with said member being at diametrically opposite sides thereof, so as to provide a center draft on said member. The bifurcated lever 8 has a cross-bar 10 between its forked ends. This bar 10 is introduced in one of the notches 4 and forms a fulcrum for said lever upon which the load resting on the member 6 is lifted.

11 is a dog comprising a pair of bars which are pivoted at 12 to the member 6 at diametrically opposite sides of said member. These bars have the cross-bar 13, which enters one of the notches 4 and supports the said member and its load when the lever 8 is raised to secure a new purchase for a further lifting of the load. The positive engagement of one of the notches by the cross-bar 13 of the dog 11 is insured by weighting the opposite end 14 of the pair of bars comprised in said dog.

To disengage the dog 11 and hold it out of engagement during the lowering of the load a notch at a time of said jack, I provide the push-rods 15, which pass in a loop around the standard and adjustable member and have their ends secured to the slide 16, which is adjustable longitudinally of the lever 8. By moving the rods from the position shown by the full lines in Fig. 1 to the position shown by the dotted lines the weighted end of the dog 11 will be raised, so as to remove the cross-bar 13 away from the notches 4. In lowering a load the rods will be utilized, as above described, to disengage the dog until the notch which last held the dog is passed, then the rods will be withdrawn to allow the dog to swing into engagement with the next notch below, and the load will be held while the lever is being changed to a lower notch. The use of the rods for disengaging the dog is a novel and important feature of my invention.

The member 6 is provided with a telescopic extension 17, having a series of indents or perforations 18 to receive a catch 19. The latter is on the free end of a spring 20, the lower end of which is secured to the member 6. The action of the spring is to press the catch inwardly into an opposite perforation. The catch is beveled on its under side to allow the extension to be drawn out without hindrance from the catch.

Having thus fully described my invention, what I claim as new, and wish to secure by Letters Patent, is—

1. A lifting-jack comprising a base, a notched standard supported by the base, an adjustable member secured to the standard on the side of the latter opposite the notches, a hand-lever having a bifurcated end, links pivotally secured to the movable member and to the bifurcated ends of the lever, the latter having a catch to engage one of the notches of the standard, a dog pivotally secured to said adjustable member, means to compel its engagement with one of the notches of the standard, and rods attached to the hand-lever adapted to be moved to and from the dog to cause the latter to move out of or into engagement with said notches of the standard.

2. A lifting-jack comprising a base, a standard supported by the base said standard having a longitudinal row of notches, a hollow adjustable member opposite the notched side of the standard, said hollow member having a telescopic extension and a spring-catch to hold a given adjustment of said telescopic extension, a hand-lever having a bifurcated end, links pivotally connected with the bifurcated ends of the lever and with the hollow adjustable member, said lever having a portion to engage the notches of the standard in succession, a slide mounted on the handle of the lever, rods connected with the slide and forming a loop around the standard and its adjustable member, said rods being adjusted longitudinally by the adjustment of the slide on the lever, a pawl pivotally attached to the adjustable member and having a portion at one end to engage the notches, in succession, of the standard and having its opposite end weighted, said pawl being placed in the path of the adjustable rods so as to be disengaged from the notches of the standard by the movement against said pawl of said rods.

In witness whereof I have hereunto set my hand and seal, at Indianapolis, Indiana, this 6th day of April, A. D. 1903.

JOHN J. McFERRIN. [L. S.]

Witnesses:
JOHN J. VALDENAIRE,
JOSEPH A. MINTURN.